United States Patent [19]  [11] Patent Number: 5,200,988
Riskin                                 [45] Date of Patent:   Apr. 6, 1993

[54] METHOD AND MEANS FOR TELECOMMUNICATIONS BY DEAF PERSONS UTILIZING A SMALL HAND HELD COMMUNICATIONS DEVICE

[75] Inventor: Bernard N. Riskin, Lambertville, N.J.

[73] Assignee: Fon-Ex, Inc., Lambertville, N.J.

[21] Appl. No.: 666,954

[22] Filed: Mar. 11, 1991

[51] Int. Cl.$^5$ ............................................. H04M 11/00
[52] U.S. Cl. ............................................. 379/52; 379/96
[58] Field of Search ............................. 379/52, 97–99, 379/96

[56] References Cited

U.S. PATENT DOCUMENTS

| 3,507,376 | 4/1970 | Kafafian . | |
|---|---|---|---|
| 3,781,802 | 12/1973 | Kafafian . | |
| 3,831,296 | 8/1974 | Hagle . | |
| 3,925,779 | 12/1975 | Gerstenhaber . | |
| 4,012,599 | 3/1977 | Meyer . | |
| 4,028,493 | 6/1977 | Brennemann | 379/99 |
| 4,075,621 | 2/1978 | Salmon . | |
| 4,191,854 | 3/1980 | Coles . | |
| 4,241,521 | 12/1980 | Dufresne . | |
| 4,268,721 | 5/1981 | Nielson et al. . | |
| 4,307,266 | 12/1981 | Messina . | |
| 4,421,953 | 12/1983 | Zielinski | 379/52 |
| 4,442,318 | 4/1984 | Desrochers | 379/99 |
| 4,471,165 | 9/1984 | De Fino et al. | 379/99 |
| 4,620,064 | 10/1986 | Kessler et al. | 379/99 |
| 4,650,927 | 3/1987 | James . | |
| 4,677,659 | 6/1987 | Dargan . | |
| 4,754,474 | 6/1988 | Feinson | 379/52 |
| 4,777,469 | 10/1988 | Engelke et al. . | |
| 4,866,759 | 9/1989 | Riskin | 379/97 |
| 4,897,868 | 1/1990 | Engelke et al. . | |
| 4,908,845 | 3/1990 | Little . | |
| 4,918,721 | 4/1990 | Hashimoto . | |

FOREIGN PATENT DOCUMENTS 63-54850  3/1988  Japan ..................................... 379/52

Primary Examiner—James L. Dwyer
Assistant Examiner—Wing F. Chan
Attorney, Agent, or Firm—Sperry, Zoda & Kane

[57] ABSTRACT

A telecommunications device adapted to be positioned between the sending telephone and the line connection thereof or attachable with respect to a sending telephone by way of an audio coupling wherein the DTMF (Digital Tone Multiple Frequency) keypad of the Touch-Tone telephone is utilized to spell words on a visual display device of the communications device which can be used in combination with a packet network telecommunications system having access nodes with word guessing capability wherein the word is spelled letter-by-letter and is compared against a dictionary of words having the DTMF keypad code. The code is displayed on the screen initially with the word then being telecommunicated to a remote electronic database dictionary which guesses the most frequently used word and displays it on the display screen of the hand held device. The so-chosen word can be indicated as a positive match wherein it is stored for transmission or as a negative match wherein the next most frequently used word matching that DTMF keypad code is provided by the remote electronic dictionary for display on the visual display screen. A message is created in this fashion word-by-word and is then transmitted through a telephone line interface to a remotely located receiving location wherein reception can be in any conventional manner or can be through another similarly positioned hand held communication device associated with a receiving telephone.

22 Claims, 1 Drawing Sheet

METHOD AND MEANS FOR TELECOMMUNICATIONS BY DEAF PERSONS UTILIZING A SMALL HAND HELD COMMUNICATIONS DEVICE

BACKGROUND OF THE INVENTION

1. Field Of The Invention

The present invention deals with the field of telecommunications devices for aiding of handicapped persons in telecommunications. In particular the present invention deals with telecommunications devices for aiding telephony by deaf handicapped persons.

Currently available in the state-of-the-art is a TDD (Telecommunication Device for the Deaf) which can utilize a keyboard and/or acoustical cups for communication by a deaf person with a conventional telephone. This communication device is excessively large due to the inclusion of the keypad within the telecommunication device itself.

2. Description Of The Prior Art

With prior art devices such as the telecommunications device for the deaf, the size of the device has become increasingly important in view of the fact that a deaf person does not wish to carry a large cumbersome item around with them at all times. As such these devices have relatively little utility. On the other hand the small hand held telecommunications device of the present invention otherwise known as the STDD (Shirt Pocket Telecommunications Device For The Deaf) is the functional equivalent of the ordinary Telecommunications Device of the Deaf but does not include any keypad. The off-loading of the keypad function to the conventional touch-tone telephone which is interfaced with a telecommunications access node and the deletion of the acoustical cups provides a simplification and miniaturization of the telecommunications aid for the deaf which gives rise to a much broader application and much greater utilitarian possibilities. That is, it becomes convenient and practical for every hearing impaired person to carry one of these devices in view of the small size, cost and weight of the STDD Shirt Pocket Telecommunications Device For The Deaf as compared to the current state-of-the-art available Telecommunications Device For The Deaf.

Examples of prior art communication aids for the deaf are shown in the following United States Patents namely, U.S. Pat. No. 4,866,759 patented Sep. 12, 1989 to B. Riskin on a Packet Network Telecommunications System Having Access Nodes With Word Guessing Capability; U.S. Pat. No. 3,507,376 patented Apr. 21, 1970 to H. Kafafian on a Communication System For The Handicapped; U.S. Pat. No. 3,781,802 patented Dec. 25, 1973 to H. Kafafian on a Method Of Communication And/or Testing Of The Handicapped; U.S. Pat. No. 3,831,296 patented Aug. 27, 1974 to E. Hagle on an Alphanumeric Tactile Information Communication System; U.S. Pat. No. 3,925,779 patented Dec. 9, 1975 to S. Gerstenhaber on a Message Communicator For Handicapped Persons; U.S. Pat. No. 4,012,599 patented Mar. 15, 1977 to J. Meyer on a Telephone Communications System For The Deaf; U.S. Pat. No. 4,075,621 patented Feb. 21, 1978 to D. Salmon on a Hand Held Communication Aid For The Dumb; U.S. Pat. No. 4,191,854 patented Mar. 4, 1980 to G. Coles on a Telephone-Coupled Visual Alphanumeric Communication Device For Deaf Persons; U.S. Pat. No. 4,241,521 patented Dec. 30, 1980 to A. Dufresne on a Multi-Symbol Message Communicator For A speechless, Handicapped Person; U.S. Pat. No. 4,268,721 patented May 19, 1981 to D. Nielson et al on a Portable Telephone Communication Device For The Hearing Impaired; U.S. Pat. No. 4,307,266 patented Dec. 22, 1981 to J. Messina on a Communication Apparatus For The Handicapped; U.S. Pat. No. 4,650,927 patented Mar. 17, 1987 to L. James on a Processor-Assisted Communication System Using Tone-Generating Telephones; U.S. Pat. No. 4,677,659 patented Jun. 30, 1987 to J. Dargan on a Telephonic Data Access And Transmission System; U.S. Pat. No. 4,777,469 patented Oct. 11, 1988 to R. Engelke et al on a Public Terminal Receptacle; U.S. Pat. No. 4,897,868 patented Jan. 30, 1990 to R. Engelke et al on a Public Terminal Receptacle; U.S. Pat. No. 4,908,845 patented Mar. 13, 1990 to P. Little on an Audio/Telephone Communication System For Verbally Handicapped and U.S. Pat. No. 4,918,721 patented Apr. 17, 1990 to K. Hashimoto on a Push Button Phone Capable Of Sending To The Telephone Line Alphabetical Characters.

SUMMARY OF THE INVENTION

The hand held telecommunications device of the present invention is usable by deaf persons with a sending telephone which includes a DTMF keypad. Preferably the hand held telecommunications device is connected between the telephone and the telephone line means associated therewith to facilitate the sending of signals by the hand held telecommunications device to an access node apparatus through a telecommunications access node having a remotely located electronic dictionary to facilitate telecommunications to a remotely located receiving station. The telecommunications device itself preferably includes a code receiving input device which is attachable with respect to the sending phone and is adapted to receive a numerical DTMF keypad code signal therefrom corresponding to a desired word entered in the DTMF keypad of the sending telephone. The code input means preferably includes a conventional jack means which is the output of the sending telephone itself commonly known as an RJ-11 jack device.

Furthermore the hand held or shirt pocket telecommunications device for the deaf preferably includes a visual display device capable of displaying the numerical DTMF keypad code received from the DTMF keypad of the sending telephone and for also displaying words thereupon received from through the telephone line means from the remotely located electronic dictionary to facilitate determination whether a positive match or a negative match has been achieved by the chosen word.

A decoding matrix device is also adapted to receive the DTMF keypad codes from the code input device and to receive words in digital format from the remotely located electronic dictionary to facilitate display thereof upon the visual display means. This visual display means can be of any configuration however preferably includes a twenty character display means arranged preferably in two rows wherein the display is achieved through a liquid crystal display device.

The hand held telecommunications device further includes an output device which is attachable with respect to the telephone line means associated with the sending telephone to facilitate telecommunications through the decoding matrix with respect to the telephone line means. In particular the output means includes a RJ-11 wall jack or a facility for receiving an RJ-11 wall jack to facilitate contact directly to the telephone line means which originally directly fed into the sending telephone.

As such, with this configuration in usage a deaf person would unhook the sending telephone from the telephone wall means or telephone wall jack and would plug the sending telephone itself in through the code input means of the hand held telecommunications device. This telecommunications device would then be connected through the output means thereof directly into the wall jack which the sending telephone had originally been connected into. In this manner the hand held or shirt pocket telecommunications device for the deaf would be positioned between the sending telephone and the telephone line means or telephone wall jack normally used thereby.

It is an object of the improved hand held telecommunications device of the present invention to provide a hand held or shirt pocket telecommunications device for deaf persons which is small in size.

It is an object of the improved hand held telecommunications device of the present invention to provide a hand held or shirt pocket telecommunications device for deaf persons which is extremely lightweight.

It is an object of the improved hand held telecommunications device of the present invention to provide a hand held or shirt pocket telecommunications device for deaf persons which is a functional equivalent of an ordinary telecommunications device for the deaf but which is of smaller size in view of the omission of a keyboard.

It is an object of the improved hand held telecommunications device of the present invention to provide a hand held or shirt pocket telecommunications device for deaf persons which is a functional equivalent of an ordinary telecommunications device for the deaf but which is of smaller size in view of the omission of acoustical cups.

It is an object of the improved hand held telecommunications device of the present invention to provide a hand held or shirt pocket telecommunications device for deaf persons which is small and light enough to fit in a shirt pocket or purse.

It is an object of the improved hand held telecommunications device of the present invention to provide a hand held or shirt pocket telecommunications device for deaf persons which can be used with any conventional touch-tone sending telephone.

It is an object of the improved hand held telecommunications device of the present invention to provide a hand held or shirt pocket telecommunications device for deaf persons which can be easily and quickly connected with respect to a sending telephone.

It is an object of the improved hand held telecommunications device of the present invention to provide a hand held or shirt pocket telecommunications device for deaf persons which can include a twenty character liquid crystal display screen for displaying DTMF keypad codes and words guessed as matches thereto.

It is an object of the improved hand held telecommunications device of the present invention to provide a hand held or shirt pocket telecommunications device for deaf persons which is usable with modular telephone jacks.

It is an object of the improved hand held telecommunications device of the present invention to provide a hand held or shirt pocket telecommunications device for deaf persons which can be used with respect to a remotely located electronic dictionary for guessing word matches and building a word message.

It is an object of the improved hand held telecommunications device of the present invention to provide a hand held or shirt pocket telecommunications device for deaf persons which can be powered by a small internal self-contained battery.

It is an object of the improved hand held telecommunications device of the present invention to provide a hand held or shirt pocket telecommunications device for deaf persons which can be powered by connection to the electrical power source in the telephone line means.

It is an object of the improved hand held telecommunications device of the present invention to provide a hand held or shirt pocket telecommunications device for deaf persons which provides a convenient and always available means for telecommunications for hearing impaired persons.

It is an object of the improved hand held telecommunications device of the present invention to provide a hand held or shirt pocket telecommunications device for deaf persons which is extremely portable.

It is an object of the improved hand held telecommunications device of the present invention to provide a hand held or shirt pocket telecommunications device for deaf persons which is extremely easy in operation and usage thereof.

It is an object of the improved hand held telecommunications device of the present invention to provide a hand held or shirt pocket telecommunications device for deaf persons which can include a radio paging receiver and signaling means for notification of a "waiting call".

It is an object of the improved hand held telecommunications device of the present invention to provide a hand held or shirt pocket telecommunications device for deaf persons which is inconspicuous when carried by deaf or hard of hearing persons.

It is an object of the improved hand held telecommunications device of the present invention to provide a hand held or shirt pocket telecommunications device for deaf persons which can include MACRO codes for speaking of pre-programmed canned messages.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
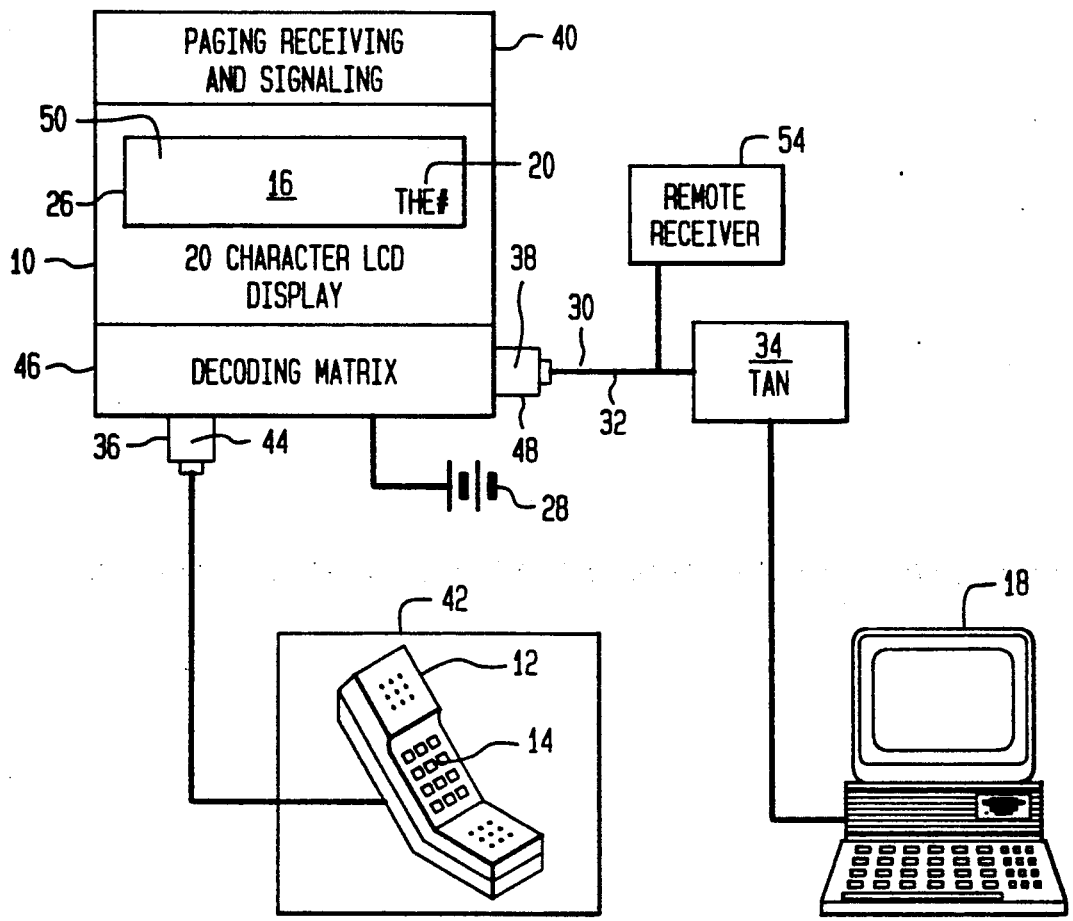
FIG. 1 is a schematic illustration of an embodiment of the telecommunications method and means of the present invention used by deaf persons utilizing a small hand held telecommunications device.
Figure 2:
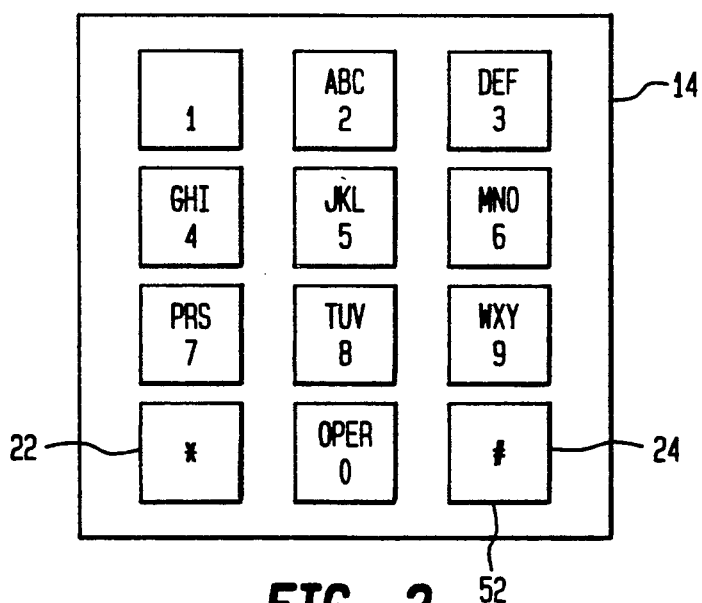
FIG. 2 is a front plan view of a DTMF keypad of a conventional telephone.

The present invention provides a hand held telecommunications device 10 adapted to be attached with respect to a sending telephone 12. The sending telephone 12 must include a DTMF keypad 14 to facilitate the generation of signals for determining the words desired to be transferred by deaf or hard of hearing persons.

Hand held telecommunications device 10 preferably includes a visual display means 16 preferably in the form of a twenty character visual display screen 26 which preferably takes the form of a liquid crystal display device 50.

The hand held or shirt pocket telecommunications device 10 includes a code input means 44 adapted to receive an input jack 36 such as a conventional RJ-11 input jack mounted therein and connected directly to the sending telephone 12.

Furthermore the shirt pocket telecommunications device 10 preferably includes a code output means 48 such as an output jack means 38 capable of receiving or specifically including an RJ-11 output jack adapted to connect the sending telephone 12 with respect to the telephone line means 32 normally associated with the specific sending telephone 12.

That is, in positioning the telecommunications device 10 the sending telephone 12 is disconnected with respect to the telephone line means 32 normally in the wall immediately thereadjacent. The sending telephone 12 is then connected normally through an RJ-11 jack directly into the hand held telecommunications device 10. The telecommunications device 10 then is connected through an RJ-11 input jack to the telephone line means 32 in which the sending telephone 12 was originally connected. In this manner the telecommunications device 10 is positioned in line between sending telephone 12 and telephone line means 32.

With this configuration the hand held telecommunications device 10 can include its own discrete power source such as a battery 28 or can be connected to the telephone line power source 30 which is connected thereto through the telephone line means 32.

The DTMF keypad 14 is adapted to spell a word letter-by-letter thereon with the resulting DTMF numeric code being shown upon the visual display means 16. If this code is deemed correct by the sender a completed word key signal 52 will be punched by the user which then will communicate the DTMF keypad code through the telephone line means 32 and through the telecommunications access mode 34 to a remotely located electronic databank or dictionary 18. This device may specifically include a microprocessor as shown in FIG. 1.

This electronic dictionary databank 18 will determine what word or words 20 match the input code and will re-transmit through the telecommunications access node 34 back to the hand held telecommunications device 10 to display upon the visual display means 16 the most commonly used word which matches the DTMF keypad code.

The user will then view the word so indicated and touch a key to indicate a positive match signal key 22 or a negative match signal key 24. Chosen keys can be any single key or combination of keys but the basic signal will be so indicated. If a positive match is indicated then the word will be stored for transmission. If a negative match is indicated the hand held telecommunications device 10 will re-transmit through the negative match signal through the telecommunications access node 34 such that the electronic dictionary 18 will know to now render the next most frequently used word back to the hand held telecommunications device 10. This process will be repeated until a positive match signal key 22 is indicated by the user at which point the word will be stored for transmission to the remote receiving location 54 when later desired.

With certain configurations of sending telephones 12 it may be that it is hard wired directly with respect to the telephone line means 32. With this configuration the apparatus of the present invention can include an audio coupling 42 for audio coupling of the hand held telecommunications device 10 with respect to the sending telephone 12.

A decoding matrix means 46 is positioned between the input signals and the visual display means 16 of the hand held telecommunications device 10 to facilitate the proper display of characters visually upon the display means 16.

The hand held telecommunications device 10 of the present invention makes use of the packet network telecommunications system having access nodes with word guessing capability completely described in U.S. Pat. No. 4,866,759 issued Sep. 12, 1989, and the Continuation-In-Part application thereof, namely, U.S. Pat. No. 5,031,206 issued Jul. 9, 1991, on "Method And Apparatus For Identifying Words Entered On DTMF Pushbuttons", both to the same inventor as the present application. The packet network telecommunications system of that design is usable with the small hand held telecommunications device 10 of the present invention to provide a handicapped telecommunications system not anticipated heretofore. U.S. Pat. No. 4,866,759 and the above-identified Continuation-In-Part application are hereby incorporated by reference into the present application.

In use the telecommunications device 10 of the present invention communicates to the remote receiving location 54 a grouping of words built up by successive guesses until a positive match signal 22 is generated with respect to each desired word to be communicated by the deaf person along the telephone lines 32.

This process can be initially indicated by a notification by radio signalling means of an incoming call. Normally with a deaf person the knowledge of an incoming call is difficult to obtain. As such the apparatus of the present invention may preferably include a radio paging receiving means 40 adapted to receive a radio signal through a conventional page receiving means as well as an indicator means such as a vibration means or a light generating means to indicate to the deaf person that an incoming call is on its way. The user will then move to any conventionally available telephone having a DTMF keypad to initiate the conversation.

The user will unhook the sending telephone 12 from the telephone line 32 thereof and will plug the telephone 12 itself into the input jack 36 of the telecommunications device 10. The telecommunications device 10 itself will then be plugged into the telephone line means 32. At this point the user is now "on line".

The user can then initiate a message by accessing the telecommunications access node and then spelling a word letter-by-letter utilizing the DTMF keypad on the sending telephone. This word will be displayed letter-by-letter in the numerical DTMF keypad code on the visual display screen of the hand held communications device 10.

The user will then enter a completed word signal on the DTMF keypad 14 after completion of the spelling of the word letter-by-letter on the numerical DTMF keypad 14. The displayed numerical DTMF keypad code will then be transmitted responsive to the entering of a completed word signal 52 to a remotely located electronic databank or dictionary 18. The dictionary will then match the transmitted numerical DTMF keypad code with respect to at least one of the words of the dictionary and will specify the most frequently used word first. This most frequently matching word will be then re-transmitted through the telecommunications access node and the decoding matrix to the hand held telecommunications device 10 for display upon the visual display means thereof.

The user will then indicate a match signal on the DTMF keypad to determine whether the displayed word is the correct matching word for the DTMF keypad code originally entered at the sending telephone. This match signal will indicate a positive match or a negative match. If a negative match is indicated this signal will be transmitted through the telecommunications access node 34 to the remotely located electronic dictionary 18 and the next most frequently used word will be re-transmitted through telecommunications access node 34 to the telecommunications device 10 for display upon the visual display screen 16. This process is continued until a match signal is entered on the DTMF keypad 14. Once the match signal is achieved the displayed word will be stored in digital format and the process will be repeated until the complete message is built by the user and then the message will be transmitted in digital format to the remotely located receiving station 54.

The shirt pocket or hand held telecommunications device of the present invention in this manner will be a functional equivalent of a conventional telecommunications device for the deaf however without the necessity of including a keyboard or acoustical cups thereby greatly reducing the size thereof. The size of this device will then be small enough and light enough to fit within a shirt pocket or purse. The keyboard function is provided by the DTMF keypad of the sending telephone rather than including a discrete keypad within the hand held telecommunications device 10 itself. This device can be made as small as five inches by two inches such that it is just large enough to hold a twenty character liquid crystal visual display screen 26. As long as the device is utilized with a sending telephone 12 which utilizes a modular telephone jack there is no use for the acoustical cups. A small microprocessor may be programmed in read-only memory which controls the operation of the unit. Power requirements to drive the liquid crystal display 50 may require a small discrete battery power source 28 or may be taken directly off of the telephone line power source 30.

The telecommunications device 10 can include pre-programmed macros such as a particular signal in order to indicate canned messages such as "Hello" or "This current telecommunications is with a hard of hearing person using a telecommunications aid device.".

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A method for telecommunications particularly usable by deaf persons from a sending telephone to a remote receiving location utilizing a small hand held communications device attachable with respect to the sending telephone having a DTMF keypad, comprising the steps of:
   a) spelling a word letter-by letter with one keystroke per letter by utilizing the DTMF keypad on the sending telephone;
   b) displaying the word letter-by-letter in numerical DTMF keypad code on the visual display means of the hand held communications device;
   c) entering of a completed word signal on the DTMF keypad after completion of said spelling of the word letter-by-letter in numerical DTMF keypad code;
   transmitting of the displayed numerical DTMF keypad code, responsive to said entering of a completed word signal, to a remotely located electronic databank having a dictionary of words with their associated numerical DTMF keypad codes stored therein;
   e) matching of the transmitted numerical DTMF keypad code with respect to at least one of the words of the dictionary at a remote receiving location, the words of the dictionary for each specific numerical DTMF keyboard code being ordered according to frequency of usage thereof;
   f) sending back by a remote receiving location of the most frequently used matching word for display upon the visual display means;
   g) entering of a match signal on the DTMF keypad to determine whether the displayed word is the correct matching word for the DTMF keypad code originally entered at the sending telephone, said entering of a match signal including possible signals of a positive match and a negative match;
   h) transmitting of a next word signal to the remotely located electronic databank responsive to a negative match signal;
   i) sending back by a remote receiving location of the next most frequently used matching word for display upon the visual display means responsive to a negative match signal;
   j) entering of a next match signal on the DTMF keypad to determine whether the next displayed word is the correct matching word for the DTMF keypad code originally entered at the sending telephone, said entering of a next match signal including possible specification of a positive next match and a negative next match;
   k) repeating of the steps of said transmitting of a next word signal by a small hand held communication device, said sending back of the next most frequently used matching word by a remote receiving location and said entering of a next match signal responsive to a negative next match signal by the user;
   l) storing of a displayed word in digital format responsive to a positive match signal by a small hand held communication device; and
   m) transmitting of at least one displayed word of a message in digital format by a small hand held communication device to a remote receiving location.

2. A method for telecommunications particularly usable by deaf persons from a sending telephone to a remote location utilizing a small hand held communications device attachable with respect to the sending telephone having a DTMF keypad as defined in claim 1 wherein said displaying of the word letter-by-letter in numerical DTMF keypad code includes displaying of the word letter-by-letter onto a twenty character visual display screen included in the hand held communications device.

3. A method for telecommunications particularly usable by deaf persons from a sending telephone to a remote location utilizing a small hand held communications device attachable with respect to the sending telephone having a DTMF keypad as defined in claim 1 wherein said sending back of the most frequently used matching word for display includes displaying of the most frequently used matching word on a twenty character visual display screen included in the hand held communications device.

4. A method for telecommunications particularly usable by deaf persons from a sending telephone to a remote location utilizing a small hand held communications device attachable with respect to the sending telephone having a DTMF keypad as defined in claim 1 wherein said sending back of the next most frequently used matching word for display includes displaying of the next most frequently used matching word on a twenty character visual display screen included in the hand held communications device.

5. A method for telecommunications particularly usable by deaf persons from a sending telephone to a remote location utilizing a small hand held communications device attachable with respect to the sending telephone having a DTMF keypad as defined in claim 1 further including attaching of the hand held communications device with respect to a discrete power source.

6. A method for telecommunications particularly usable by deaf persons from a sending telephone to a remote location utilizing a small hand held communications device attachable with respect to the sending telephone having a DTMF keypad as defined in claim 1 further including audio coupling of the hand held communications device with respect to the sending telephone.

7. A method for telecommunications particularly usable by deaf persons from a sending telephone to a remote location utilizing a small hand held communications device attachable with respect to the sending telephone having a DTMF keypad as defined in claim 1 wherein said transmitting of the displayed numerical DTMF keypad code is communicated to a telecommunications access node to facilitate analysis thereof.

8. A method for telecommunications particularly usable by deaf persons from a sending telephone to a remote location utilizing a small hand held communications device attachable with respect to the sending telephone having a DTMF keypad as defined in claim 7 further including receiving of the transmitted code at the telecommunications access node by a computerized processing means to facilitate searching of the remotely located electronic databank dictionary.

9. A method for telecommunications particularly usable by deaf persons from a sending telephone to a remote location utilizing a small hand held communications device attachable with respect to the sending telephone having a DTMF keypad as defined in claim 1 further including plugging of the sending telephone into the hand held communications device to facilitate displaying of the word letter-by-letter and possible matching words on the visual display means and to facilitate reception of signals by the hand held communications device from the DTMF keypad of the sending telephone.

10. A method for telecommunications particularly usable by deaf persons from a sending telephone to a remote location utilizing a small hand held communications device attachable with respect to the sending telephone having a DTMF keypad as defined in claim 1 further including plugging of the sending telephone into the hand held communications device and plugging of the hand held communications device into the telephone wall jack which normally receives the plug of the sending telephone to facilitate displaying of the word letter-by-letter and possible matching words on the visual display means and to facilitate reception of signals by the hand held communications device from the DTMF keypad of the sending telephone.

11. A method for telecommunications particularly usable by deaf persons from a sending telephone to a remote location utilizing a small hand held communications device attachable with respect to the sending telephone having a DTMF keypad as defined in claim 1 further including plugging of the sending telephone into the hand held communications device to facilitate reception of the completed word signal from the DTMF keypad thereof.

12. A method for telecommunications particularly usable by deaf persons from a sending telephone to a remote location utilizing a small hand held communications device attachable with respect to the sending telephone having a DTMF keypad as defined in claim 1 further including decoding of signals sent to the visual display means to facilitate the display of characters thereupon.

13. A method for telecommunications particularly usable by deaf persons from a sending telephone to a remote receiving location utilizing a small hand held communications device attachable with respect to the sending telephone having a DTMF keypad, comprising the steps of:
 a) attaching of the hand held communications device with respect to the sending telephone;
 b) spelling a word letter-by-letter with one keystroke per letter utilizing the DTMF keypad on the sending telephone;
 c) displaying the word letter-by-letter in numerical DTMF keypad code on a twenty character visual display means of the hand held communications device;
 d) entering of a completed word signal on the DTMF keypad after completion of said spelling of the word letter-by-letter in numerical DTMF keypad code;
 e) transmitting of the displayed numerical DTMF keypad code, responsive to said entering of a completed word signal, to a remotely located telecommunications access node having an electronic databank with a dictionary of words with their associated numerical DTMF keypad codes stored therein;
 f) receiving of the transmitted code at the telecommunications access node by a computerized processing means to facilitate searching of the remotely located electronic databank dictionary;
 g) matching of the transmitted numerical DTMF keypad code with respect to at least one of the words of the dictionary at a remote receiving location, the words of the dictionary for each specific numerical DTMF keyboard code being ordered according to frequency of usage thereof;

h) sending back by a remote receiving location of the most frequently used matching word for display upon the twenty character visual display means;

i) entering of a match signal on the DTMF keypad to determine whether the word displayed on the twenty character visual display mans is the correct matching word for the DTMF keypad code originally entered at the sending telephone, said entering of a match signal including possible signals of a positive match and a negative match;

j) transmitting of a next word signal to the remotely located electronic databank responsive to a negative match signal;

k) sending back by a remote receiving location of the next most frequently used matching word for display upon the twenty character visual display means responsive to a negative match signal;

l) entering of a next match signal on the DTMF keypad to determine whether the next displayed word is the correct matching word for the DTMF keypad code originally entered at the sending telephone, said entering of a next match signal including possible specification of a positive next match and a negative next match;

m) repeating of the steps of said transmitting of a next word signal by a small hand held communications device, said sending back of the next most frequently used matching word by a remote receiving location and said entering of a next match signal responsive to a negative next match signal by a user;

n) storing of a displayed word in digital format responsive to a positive match signal by a small hand held communication device; and o) transmitting of at least one displayed word of a message in digital format by a small hand held communication device over a packet transport network to a remote receiving location.

14. A hand held telecommunications device particularly usable by deaf persons for use with a sending telephone having a DTMF keypad and being connected to a telephone line means and for use with an access node apparatus having a remotely located electronic dictionary to facilitate telecommunications to a remote receiving location, said telecommunications device comprising:

a code input means being attachable with respect to the sending telephone and adapted to receive a numerical DTMF keypad code therefrom corresponding to a desired word from the DTMF keypad of the sending telephone, said code input means further including an input jack means operatively connecting the sending telephone with respect to said decoding matrix means to facilitate display of DTMF keypad codes upon said visual display means;

b) a visual display means comprising a twenty character liquid crystal display device for displaying numerical DTMF keypad codes received from the sending telephone and for displaying words thereupon received from the telephone line means to facilitate telecommunications by deaf persons;

c) a decoding matrix means adapted to receive DTMF keypad codes from said code input means and words in digital format for facilitating display thereof upon said visual display means; and d) an output means being attachable with respect to the telephone line means associated with said sending telephone to facilitate communication of said decoding matrix means with respect to said telephone line means, said output means including an output jack means operatively connecting the telephone line means associated with the sending telephone with respect to said decoding matrix means to facilitate display of words received from the telephone line means.

15. An improved hand held telecommunications device particularly usable by deaf persons for use with a sending telephone having a DTMF keypad and being connected to a telephone line means and for use with an access node apparatus having a remotely located electronic dictionary to facilitate telecommunication to a remote receiving location, said telecommunications device comprising:

a) a code input means being attachable with respect to the sending telephone and adapted to receive a numerical DTMF keypad code therefrom corresponding to a desired word from the DTMF keypad of the sending telephone;

b) a visual display means for displaying numerical DTMF keypad codes received from the sending telephone and for displaying words thereupon received from a telephone line means to facilitate telecommunications by deaf persons;

c) a decoding matrix means adapted to receive DTMF keypad codes from said code input means and words in digital format for facilitating display thereof upon said visual display means; and d) an output means being attachable with respect to a telephone line being associated with said sending telephone to facilitate communication of said decoding matrix means with respect to a telephone line means.

16. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said telecommunications device as defined in claim 15 wherein said visual display means comprises a liquid crystal display device.

17. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 wherein said code input means includes an input jack means operatively connecting the sending telephone with respect to said decoding matrix means to facilitate display of DTMF keypad codes upon said visual display means.

18. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 wherein said output means includes an output jack means operatively connecting the telephone line means associated with the sending telephone with respect to said decoding matrix means to facilitate display of words received from the telephone line means.

19. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 wherein said code input means includes an audio coupling means operatively connecting the sending telephone with respect to said decoding matrix means to facilitate display of DTMF keypad codes upon said visual display means.

20. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 wherein said output means includes an audio coupling means operatively connecting the telephone line means associated with the sending telephone with respect to said decoding matrix means to facilitate display of words received from the telephone line means.

21. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 wherein said visual display means includes a twenty character visual display device.

22. An improved hand held telecommunications device particularly usable by deaf persons with a sending telephone having a DTMF keypad and being connected to a telephone line means and for use with an access node apparatus having a remotely located electronic dictionary to facilitate telecommunication to a remote receiving location, said improved telecommunications device as defined in claim 15 further including a battery power source means to facilitate electrical operation of the hand held telecommunications device.

* * * * *